(12) United States Patent
Yamazaki et al.

(10) Patent No.: US 7,494,227 B2
(45) Date of Patent: Feb. 24, 2009

(54) IMAGE DISPLAY DEVICE AND METHOD OF CONTROLLING IMAGE DISPLAY DEVICE

(75) Inventors: Tetsuro Yamazaki, Suwa (JP); Masatoshi Yonekubo, Hara-mura (JP); Takashi Takeda, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 382 days.

(21) Appl. No.: 11/279,501

(22) Filed: Apr. 12, 2006

(65) Prior Publication Data

US 2007/0008501 A1    Jan. 11, 2007

(30) Foreign Application Priority Data

Jul. 7, 2005    (JP)    ............... 2005-198389

(51) Int. Cl.
*G03B 21/20*    (2006.01)
*G03B 21/14*    (2006.01)
*G03B 21/26*    (2006.01)

(52) U.S. Cl. ............... 353/85; 353/84; 353/89; 353/94; 353/98; 359/196; 348/819

(58) Field of Classification Search ............... 353/29, 353/31, 84, 85, 94, 98, 121, 122; 359/196; 348/818, 819
See application file for complete search history.

(56) References Cited

U.S. PATENT DOCUMENTS

| | | | |
|---|---|---|---|
| 4,245,240 A | 1/1981 | Tanaka | 348/196 |
| 4,773,750 A * | 9/1988 | Bruning | 353/122 |
| 4,854,692 A | 8/1989 | Kobayashi | 351/221 |
| 5,291,885 A | 3/1994 | Taniji et al. | 600/310 |
| 6,575,581 B2 * | 6/2003 | Tsurushima | 353/121 |
| 7,393,107 B2 * | 7/2008 | Yonekubo et al. | 353/29 |
| 7,419,266 B2 | 9/2008 | Seki | 353/30 |
| 2002/0159036 A1 * | 10/2002 | Yamagishi et al. | 353/31 |

FOREIGN PATENT DOCUMENTS

| | | |
|---|---|---|
| JP | A-54-128217 | 10/1979 |
| JP | A-61-235992 | 10/1986 |
| JP | A-64-058237 | 3/1989 |
| JP | A-02-176513 | 7/1990 |
| JP | A-04-193158 | 7/1992 |
| JP | A 2002-281532 | 9/2002 |
| JP | A 2002-372752 | 12/2002 |
| JP | A 2004-341210 | 12/2004 |
| JP | A-2005-173097 | 6/2005 |
| WO | WO 2004/091191 A1 | 10/2004 |

* cited by examiner

*Primary Examiner*—Melissa J Koval
(74) *Attorney, Agent, or Firm*—Oliff & Berridge, PLC

(57) ABSTRACT

An image display device for displaying an image by a light beam modulated according to an image signal includes: a light source unit that supplies the light beam; a scanning unit for performing scanning with the light beam from the light source unit; a screen that transmits the light beam from the scanning unit; a light detection unit that detects light incoming from the screen via the scanning unit; and a light beam emission stop unit that stops emission of the light beam from the image display device according to an output from the light detection unit.

13 Claims, 11 Drawing Sheets

IMAGE DISPLAY DEVICE AND METHOD OF CONTROLLING IMAGE DISPLAY DEVICE

BACKGROUND

1. Technical Field

The present invention relates to an image display device and a method of controlling the image display device and, more specifically, a technology of the image display device that displays an image by scanning with a laser beam.

2. Related Art

In recent years, a laser projector employing a laser beam is proposed as an image display device for displaying images. The laser beam, which is a light beam, is characterized by high monochromaticity and directivity. Therefore, the laser projector has an advantage in that an image with high color reproducibility can be obtained. A high-output laser source is used in order to display an image by causing the laser beam to scan. The laser projector achieves display by scanning with a laser beam from the laser source at a high-speed and dispersing the same on the screen. By sealing the laser source in an enclosure, only the laser beam with dispersed intensity can be supplied out from the enclosure. Therefore, the laser beam of intensity higher than a predetermined intensity, which is considered to be dangerous, can be prevented from being emitted out of the enclosure while displaying a bright image. For example, when part of the screen is damaged, there is a case in which a laser beam which is insufficiently diffused in the screen is emitted out from the enclosure. Therefore, a technology to prevent a condition such that a laser beam of high intensity is emitted out from the enclosure from occurring by adapting the device to discontinue oscillation of a laser beam when damage of the screen is sensed. (for example, JP-A-2002-281532, JP-A-2002-372752 and JP-A-2004-341210.

As means that senses damage of the screen, an arrangement in which sensors arranged over the entire screen are used as in JP-A-2002-281532 and JP-A-2002-372752, or an arrangement in which an image-pickup device or the like that monitors a state of the screen as a technology disclosed in JP-A-2004-341210 are considered. The arrangement in which the sensors arranged over the entire screen are used is advantageous in that detection of minute damage on the entire screen is ensured. On the other hand, since a number of sensors are necessary for detecting damage on the entire screen, a cost is increased. In addition, since the amount of light which is not used for forming the image is increased, and hence the efficiency of light utilization is lowered. The arrangement in which the screen is monitored by the image-pickup device or the like is advantageous in that one single sensor is sufficient. However, since a sensor of high resolution is necessary for ensuring detection of minute damage, increase in cost is resulted. As described above, according to the related art, a problem such that it is difficult to detect abnormality of the screen with an arrangement which is simple and is able to reduce lowering of the efficiency of light utilization.

SUMMARY

An advantage of some aspect of the invention is to provide an image display device in which a condition such that abnormality of a screen can be detected and a light beam of high intensity is prevented from being emitted to the outside with an arrangement which is simple and is able to reduce lowering of the efficiency of light utilization, and a method of controlling the image display device.

According to an aspect of the invention, an image display device for displaying an image by a light beam modulated according to an image signal including: a light source unit that supplies the light beam; a scanning unit for performing scanning with the light beam from the light source unit; a screen that transmits the light beam from the scanning unit; a light detection unit that detects light incoming from the screen via the scanning unit; and a light beam emission stop unit that stops emission of the light beam from the image display device according to an output from the light detection unit is provided.

Since the scanning unit is driven so as to scan the entire surface of the screen with the light beam, when the arrangement in which the light passed through the scanning unit is detected by the light detection unit is employed, light beams proceeded from the respective pixel areas on the screen can be detected. The state of the entire screen can be monitored using a single light detection unit by utilizing displacement of the scanning unit. When abnormalities such as damage, burning, formation of a hole are occurred in the screen, the fact that the abnormality is occurred is detected by the light incoming from a part where the abnormality exists into the light detection unit. When the fact that the abnormality is occurred in the screen is detected, the light beam emission stop unit stops emission of the light beam from the image display device immediately. In this manner, by stopping the emission of the light beam from the image display device according to the output from the light detection unit, the light beam of high intensity is prevented from being emitted toward the outside of the enclosure. Since it is not necessary that the light detection unit itself can recognize two-dimensional information such as pixels by itself, the light detection unit with high resolution is not necessary. The light detection unit must simply be capable of at least detecting the light intensity, and hence may be of a simple arrangement. Since it is possible to provide the light detection unit at a position other than positions that blocks the light beam incoming into the screen, the state of the screen can be sensed without lowering the efficiency of light utilization. Accordingly, the image display device in which the abnormality of the screen can be sensed with an arrangement which is simple and is capable of reducing lowering of the efficiency of light utilization, and hence the condition such that a light beam of high intensity can be prevented from being emitted toward the outside is obtained.

Preferably, the light beam emission stop unit stops supply of the light beam from the light source unit to stop emission of the light beam from the image display device. Accordingly, the light beam of high intensity is prevented from being emitted toward the outside.

Preferably, the light beam emission stop unit shields the light beam supplied from the light source unit to stop the emission of the light beam from the image display device. Accordingly, the light beam of high intensity is prevented from being emitted toward the outside.

Preferably, the light detection unit detects the outside light that passes through the screen. Accordingly, an arrangement for supplying additional light for monitoring the state of the screen is not necessary, whereby a simple arrangement is achieved.

Preferably, the image display device includes a detection light source unit for supplying detection light to the screen, wherein the light detection unit detects the detection light reflected from the screen. Accordingly, even when the outside light is insufficient for example, the state of the screen can be monitored.

Preferably, the detection light source unit is provided in the vicinity of the light detection unit. The detection light from the screen is proceeded along the substantially same optical path as the detection light proceeded from the detection light source unit to the screen and returns toward the detection light source unit. The light proceeded from the screen toward the detection light source unit has a spread wider than the extent of spread thereof when it is emitted from the detection light source unit corresponding to the extent of being diffused in the screen. Therefore, by the provision of the detection light source unit in the vicinity of the light detection unit, entrance of the detection light from the screen into the light detection unit is ensured.

Preferably, the detection light source unit supplies the detection light having a wavelength range other than a visible range. Even when the detection light is proceeded toward the viewer with the light beam for displaying the image, an influence to contrast of the image can be reduced by employing the invisible light having the wavelength range other than the visible range as the detection light. Accordingly, lowering of the image contrast can be reduced.

Preferably, the light detection unit detects the light beam reflected from the screen. Accordingly, even under the condition in which the outside light is insufficient, the state of the screen can be monitored. The arrangement for supplying light for monitoring the state of the screen or the dichroic mirror unit for branching the light to be directed to the light detection unit from the optical path of the light beam are not necessary, and hence a simple arrangement is achieved.

Preferably, the image display device includes a dichroic mirror unit provided on the optical path of the light beam between the light source unit and the scanning unit, and the dichroic mirror unit transmits the light beam from the light source unit and reflects the light from the screen toward the light detection unit. The light proceeded from the screen via the scanning unit is proceeded along the substantially same optical path as the light beam from the light source unit. By providing the dichroic mirror unit, the light incoming into the light detection unit can be branched from the optical path of the light beam.

Preferably, the light detection unit is provided in the vicinity of the light source unit. The light proceeded from the screen via the scanning unit is proceeded along the substantially same optical path as the light beam from the light source unit, and returns to the light source unit. The light proceeded from the screen toward the light source unit has a spread wider than the light beam emitted from the light source unit corresponding to the extent of being diffused. Therefore, by providing the light detection unit in the vicinity of the light source unit, entrance of the light from the screen into the light detection unit is ensured.

Preferably, the image display device includes an aperture unit provided on the incoming side of the light detection unit. When the light from the screen is proceeded toward the light detection unit, a light beam from the range of the screen larger than the spot of the light beam is proceeded toward the light detection unit simultaneously. By providing the aperture unit on the incoming side of the light detection unit, the light from the smaller range of the screen can be detected, and hence resolution can be increased. Accordingly, the abnormality of the screen can be sensed accurately.

Preferably, the image display device includes an abnormality sensing unit that senses occurrence of an abnormality in the screen on the basis of change in light intensity detected in the light detection unit. The screen diffuses the light beam toward the viewer by a diffusion layer provided substantially uniformly therein. When there is no abnormality in the screen, and the light can be diffused substantially uniformly by the screen, the intensity of the light detected by the light detection unit is constantly changed gently. In contrast, it is considered that when the abnormality is occurred in the screen, the light intensity changes abruptly at a position where the abnormality exists. When the abrupt change in light intensity is detected by the light detection unit, the abnormality sensing unit determines that there is abnormality in the screen. In this manner, the abnormality occurred in the screen can be detected.

According to another aspect of the invention, a method of controlling an image display device including: a light source unit that supplies the light beam modulated according to the image signal; a scanning unit for performing scanning with the light beam from the light source unit; a screen that transmits the light beam from the scanning unit; a light detection unit that detects light incoming from the screen via the scanning unit; and a light beam emission stop unit that stops emission of the light beam from the image display device according to an output from the light detection unit wherein a step of sensing occurrence of abnormality in the screen at the time of activation and before emitting the light beam from the image display device is provided. By sensing the abnormality that is occurred on the screen at the time of activation of the image display device and before emitting the light beam from the image display device, a condition such that the light beam with high intensity is prevented from being emitted toward the outside at the time of activation

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
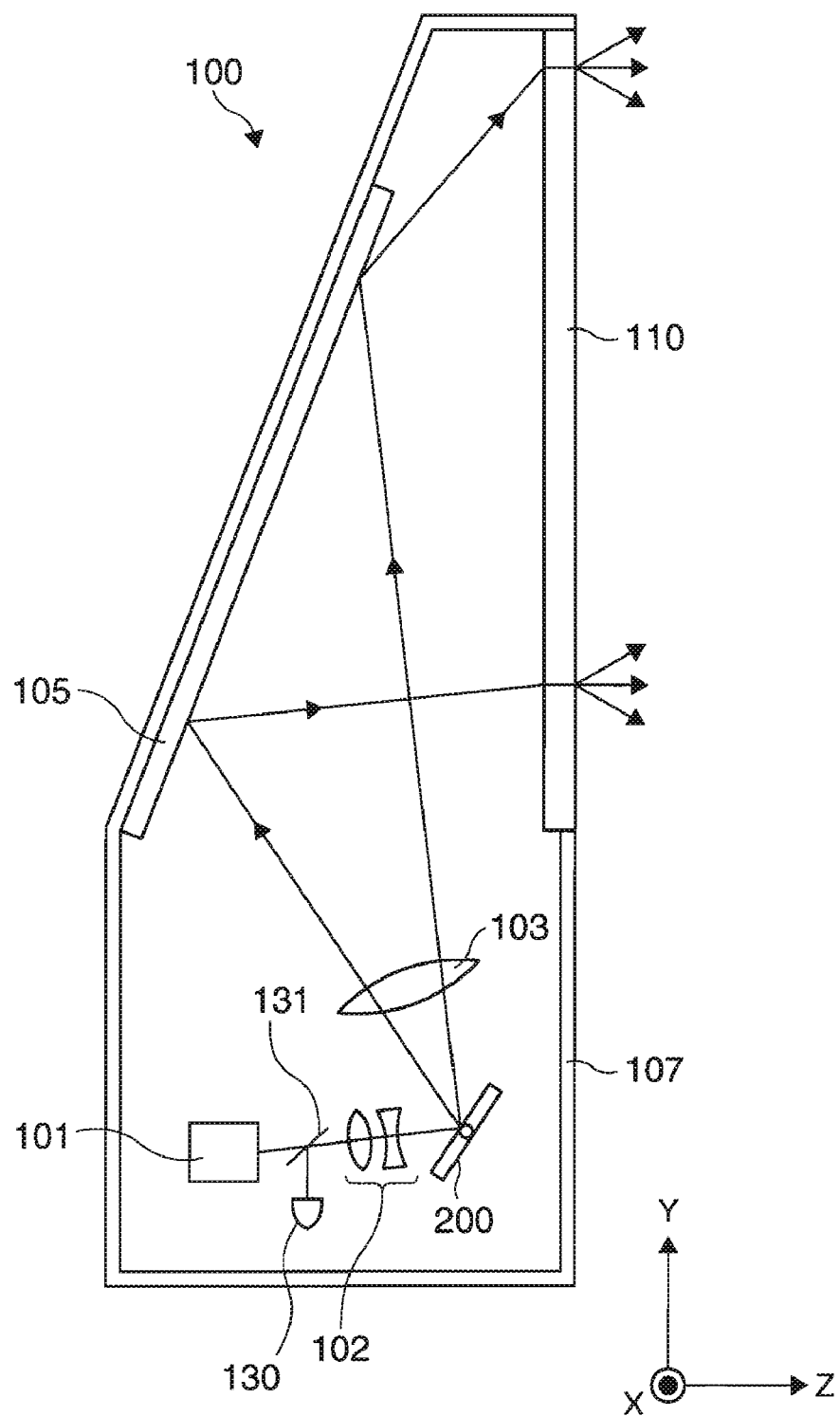
FIG. 1 is a drawing showing a schematic arrangement of an image display device according to a first embodiment of the invention.

Referring now to the drawings, embodiments of the invention will be described in detail.

First Embodiment

FIG. 1 is a schematic arrangement of an image display device 100 according to a first embodiment of the invention. The image display device 100 is so-called rear projector in which a laser beam is supplied to one of the surfaces of a screen 110, and the laser beam emitted from the other surface of the screen 110 is observed, whereby a viewer watches the image. The image display device 100 displays an image with a laser beam, which is a light beam modulated according to image signals. A laser device 101 provided in the image display device 100 supplies a laser beam. The laser beam supplied from the laser device 101 passes through an illumination optical system 102 and then enters a scanning unit 200.

Figure 2:
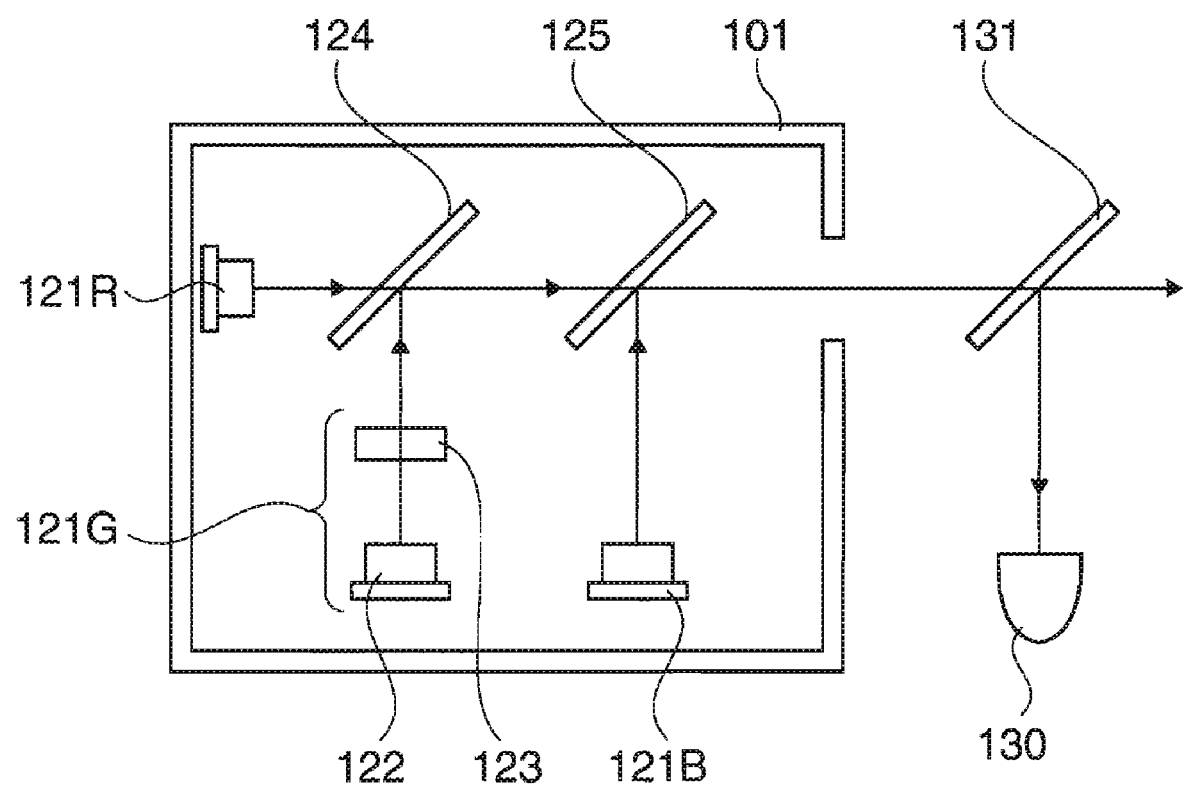
FIG. 2 is a drawing showing a schematic arrangement of a laser device and the periphery thereof.

FIG. 2 is a drawing showing a schematic arrangement of the laser device 101 and the periphery thereof. The laser device 101 includes an R-light source unit 121R for supplying red light (hereinafter referred to as "R-light"), a G-light source unit 121G for supplying green light thereinafter referred to as "G-light"), and a B-light source unit 121B for supplying blue light (hereinafter referred to as "B-light"). The R-light source unit 121R is a semiconductor laser that is a solid-state light emitting element for supplying the R-light. The B-light source unit 121B for supplying B-light is a semiconductor laser that is a solid-state light emitting element.

The G-light source unit 121G includes a semiconductor laser 122 and a wavelength conversion element 123. The wavelength conversion element 123 that can be used here is, for example, a SHG (second harmonic generation) element provided with non-linear optical crystal. The G-light source unit 121G converts a laser beam from the semiconductor laser 122 to a laser beam of a ½ wavelength by means of the wavelength conversion element 123 and emits the converted laser beam. The G-light source unit 121G, for example, supplies G-light of wavelength spectrum having a peak at 550 nanometers by employing the semiconductor laser 122 with a wavelength spectrum having a peak at 1100 nanometers.

The easily available multi-purpose semiconductor laser 122 can be employed in the G-light source unit 121G by using the wavelength conversion element 123. The G-light source unit 121G must simply supply the G-light, and is not limited to the one described above. For example, a DPSS (Diode Pumped Solid State) laser oscillator may be used in the G-light source unit 121G. The DPSS laser oscillator supplies a laser beam by exciting solid-state crystal using a laser beam from the laser source.

The respective color light source units 121R, 121G, 121B supply laser beams modulated according to the image signals respectively. Modulation according to the image signal may be any one of amplitude modulation, pulse width modulation. The laser device 101 includes two dichroic mirror units 124, 125. The dichroic mirror unit 124 transmits the R-light and reflects the G-light. The dichroic mirror unit 125 transmits the R-light and the C-light, and reflects the B-light. The R-light from the R-light source unit 121R passes through the dichroic mirror units 124, 125, and then is emitted from the laser device 101.

An optical path of the G-light from the G-light source unit 121G is bent by approximately 90 degrees by being reflected from the dichroic mirror unit 124. The G-light reflected from the dichroic mirror unit 124 passes through the dichroic mirror unit 125, and is emitted from the laser device 101. An optical path of the B-light from the B-light source unit 121B is bent by approximately 90 degrees by being reflected from the dichroic mirror unit 125. The B-light reflected from the dichroic mirror unit 125 is emitted from the laser device 101. The laser device 101 supplies the R-light, the G-light, and the B-light modulated according to the image signals.

Another dichroic mirror unit 131 is arranged on the outgoing side of the laser device 101. The dichroic mirror unit 131 is provided on an optical path between the respective color light source units 121R, 121G and 121B and the scanning unit 200 (see FIG. 1). A light detection unit 130 is provided on an optical axis which is substantially orthogonal to the optical axis of the laser beam from the laser device 101 at a position facing the dichroic mirror unit 131. The light detection unit 130 detects light incoming from the screen 110 via the scanning unit 200.

Figure 3:
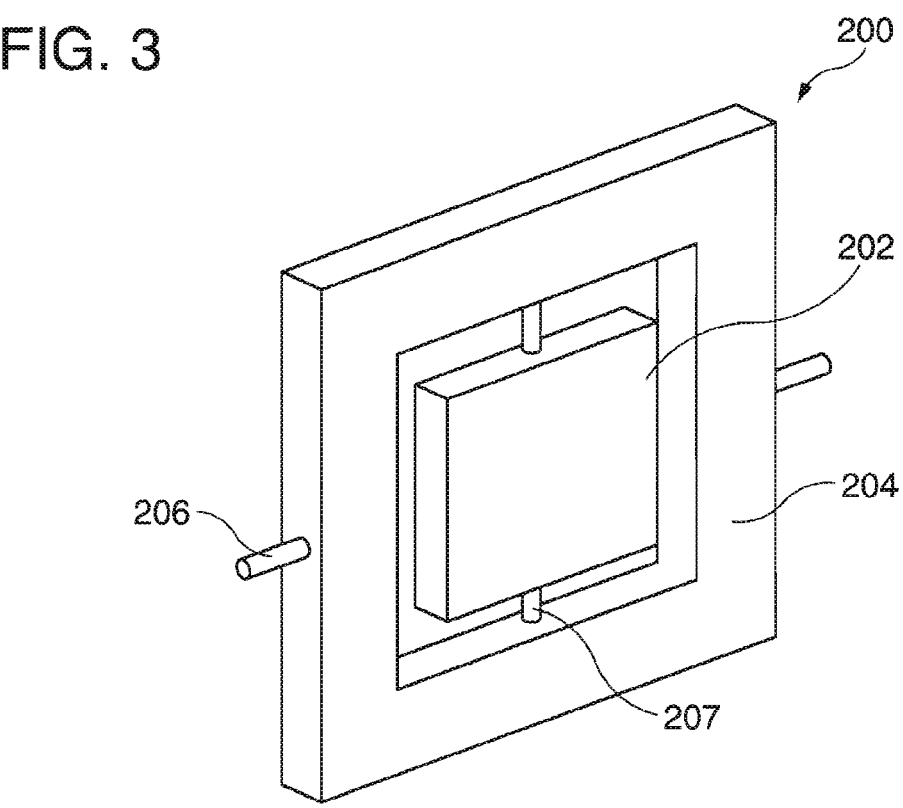
FIG. 3 is a drawing showing a schematic arrangement of a scanning unit.

FIG. 3 is a drawing showing a schematic arrangement of the scanning unit 200. The scanning unit 200 has so-called dual gimbal structure including a reflection mirror 202 and an outer frame portion 204 provided around the reflection mirror 202. The outer frame portion 204 is connected to the fixing portions, not shown, by torsion springs 206 which serve as a rotational axis. The outer frame portion 204 rotates about the torsion springs 206 using torsion of the torsion spring 206 and restoration to the original states. The reflection mirror 202 is connected to the outer frame portions 204 by torsion springs 207 which serve as a rotational axis which is substantially orthogonal to the torsion spring 206. The reflection mirror 202 reflects a laser beam from the laser device 101. The reflection mirror 202 can be obtained by forming a member of high reflexivity, for example, a metal thin film such as aluminum or silver.

The reflection mirror 202 is displaced so as to cause the laser beam to scan in Y-direction (see FIG. 1) on the screen 110 by rotational movement of the outer frame portion 204 about the torsion springs 206. The reflection mirror 202 rotates about the torsion spring 207 using the torsion of the torsion springs 207 and restoration to the original states. The reflection mirror 202 rotates about the torsion springs 207, and hence is displaced so as to achieve scanning in the X-direction with the laser beam reflected from the reflection mirror 202. In this manner, the scanning unit 200 scans in the X-direction and the Y-direction with the laser beam from the laser device 101.

Figure 4:
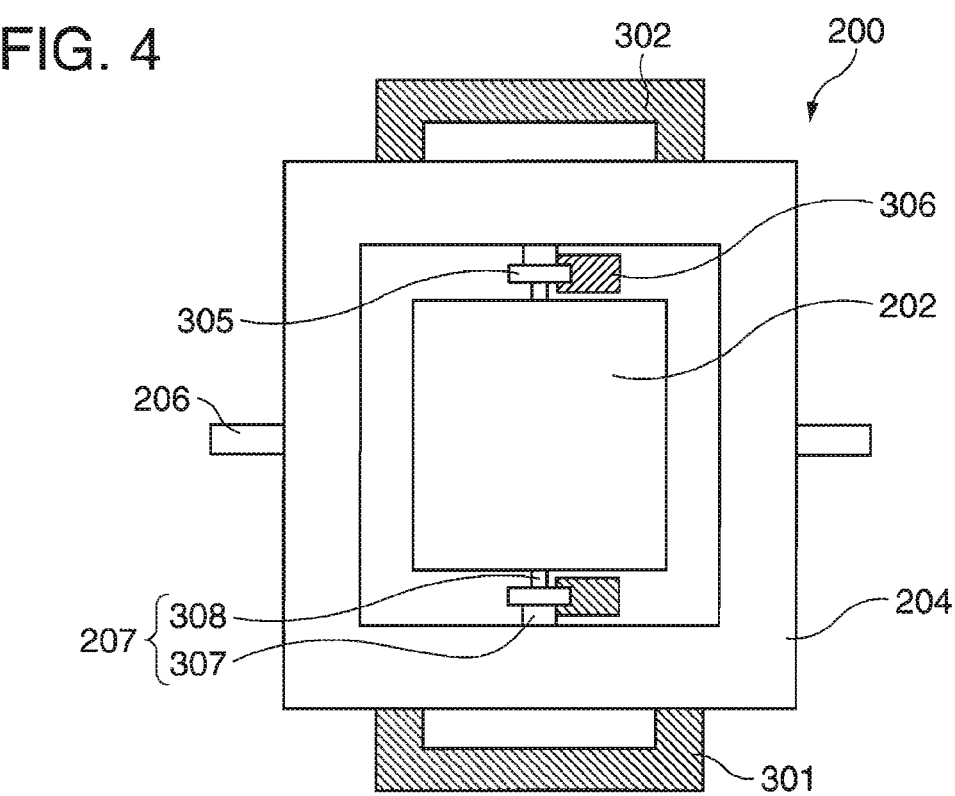
FIG. 4 is an explanatory drawing showing an arrangement for driving the scanning unit.

FIG. 4 is an explanatory drawing showing an arrangement for driving the scanning unit 200. Assuming that a side of the reflection mirror 202 that reflects the laser beam is a front side, first electrodes 301, 302 are provided in a space on a back side of the outer frame portion 204 in substantially symmetry with respect to the torsion springs 206. When a voltage is applied to the first electrodes 301, 302, a predetermined force according to a potential, for example, an electrostatic force is generated between the first electrodes 301, 302 and the outer frame portion 204. The outer frame portion 204 rotates about the torsion spring 206 by applying a voltage alternately to the first electrodes 301, 302.

Specifically, the torsion springs 207 each include a first torsion spring 307 and a second torsion spring 308. A mirror-side electrode 305 is provided between the first torsion spring 307 and the second torsion spring 308. A second electrode 306 is provided in a space on the backside of the mirror-side electrode 305. When a voltage is applied to the second electrodes 306, a predetermined force according to the potential, for example, an electrostatic force is generated between the second electrode 306 and the mirror-side electrode 305. When voltages of the same phase are applied to both the second electrodes 306, the reflection mirror 202 rotates about the torsion springs 207. The scanning unit 200 scans in the two-dimensional direction with the laser beam by rotating the reflection mirror 202. The scanning unit 200 can be formed by, for example, MEMS (Micro Electro Mechanical Systems) technology.

For example, the scanning unit 200 displaces the reflection mirror 202 so as to reciprocate the laser beam a plurality of times in the X-direction, which is a horizontal direction, while moving the laser beam once in Y-direction, which is a vertical direction during one frame duration of an image. In this manner, the scanning unit 200 is driven so that the frequency of scanning with the laser beam in the X-direction as a first direction is higher than that in the Y-direction as a second direction. In order to achieve high-speed scanning with the laser beam in the X-direction, the scanning unit 200 is preferably arranged to cause the reflection mirror 202 to resonate about the torsion spring 207. By causing the reflection mirror 202 to resonate, the amount of displacement of the reflection mirror 202 can be increased. By increasing the amount of displacement of the reflection mirror 202, the scanning unit 200 can perform scanning efficiently with the laser beam with small amount of energy. The reflection mirror 202 may also be driven without using resonance.

The arrangement of the scanning unit 200 is not limited to that of being driven by the electrostatic force according to the potential. For example, it may be an arrangement of being driven by an expansion/contraction force of a piezoelectric element or electromagnetic force. The scanning unit 200 may be composed of a reflection mirror that causes the laser beam to scan in the X-direction and a reflection mirror that causes the laser beam to scan in the Y-direction. The arrangement of the scanning unit 200 is not limited to that employing a vibration mirror having a gimbal structure, but may be a structure in which a polygon mirror composed of a rotating body having a plurality of mirror strips is rotated.

Returning back to FIG. 1, a light beam from the scanning unit 200 passes through a projection optical system 103 and enters a reflection unit 105. An illumination optical system 102 and the projection optical system 103 form the laser beam from the laser device 101 into an image on the screen 110. The reflection unit 105 reflects the laser beam from the scanning unit 200 toward the screen 110. An internal space in an enclosure 107 is sealed. The screen 110 is provided on a predetermined one surface of the enclosure 107. The screen 110 is a transmissive screen that transmits laser beams modulated according to image signals. The screen 110 includes a Fresnel lens that converts an angle of the laser beam toward a viewer and a diffusion layer for diffusing the laser beam, such as a lenticular lens, a micro-lens array or a diffusion plate. The viewer watches an image by observing light emitted from the screen 110.

Figure 5:
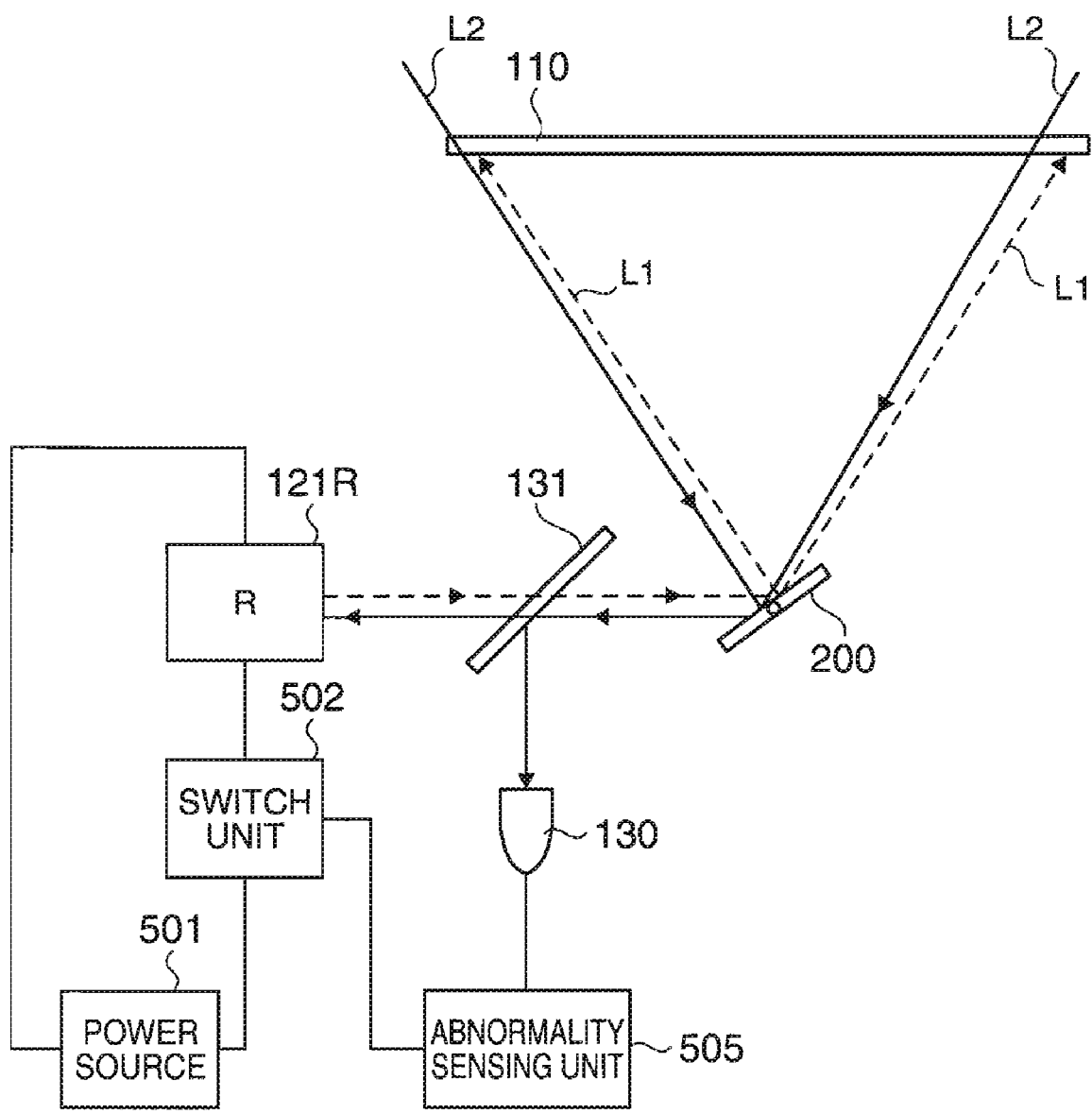
FIG. 5 is a drawing showing an arrangement for causing light from the screen to enter into a light detection unit.

FIG. 5 is an explanatory drawing showing an arrangement for causing light from the screen 110 to enter into the light detection unit 130 and an arrangement for discontinuing emission of laser beam from the image display device 100 according to an output from the light detection unit 130. In this embodiment and the following embodiments, an arrangement for discontinuing emission of a laser beam from the R-light source unit 121R out of the respective color light source units will be described as a representative example, and arrangements which are not necessary for description are omitted from the drawing.

Light from an illumination equipment or outside light such as sunlight provided outside the image display device 100 enters the interior of the enclosure 107 via the screen 110. Since the diffusion layer (not shown) is provided in the screen 110, a diffusion effect is also applied to the outside light which passes through the screen 110. The outside light L2 after having diffused in the screen 110 proceeds toward the scanning unit 200, then is reflected from the scanning unit 200, and enters the dichroic mirror unit 131 along substantially the same optical path as the laser light L1 incoming into the screen 110 in the reverse direction.

Figure 6:
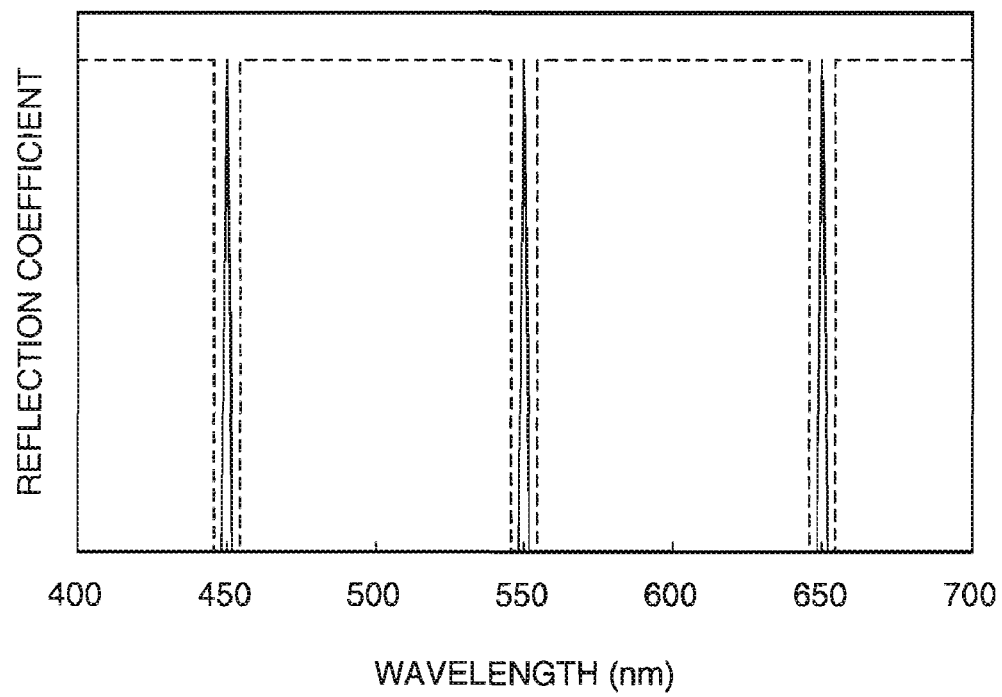
FIG. 6 is an explanatory drawing showing characteristics of a dichroic mirror unit.

FIG. 6 is an explanatory drawing showing characteristics of the dichroic mirror unit 131. Assuming that the R-light, G-light, and B-light from the laser device 101 have peak wavelength ranges at 650 nanometers, 550 nanometers, and 450 nanometers respectively. The dichroic mirror unit 131, as shown by broken lines, has a characteristic to transmit only light with wavelengths near 450 nanometers, near 550 nanometers, and near 650 nanometers, and reflect light with other wavelengths. Being capable of transmitting light with wavelengths near 450 nanometers, near 550 nanometers and near 650 nanometers, the dichroic mirror unit 131 can transmit the light beams of the respective colors from the laser device 101 toward the scanning unit 20.

The dichroic mirror unit 131 reflects light other than wavelengths near 450 nanometers, near 550 nanometers, and near 650 nanometers out of the outside light L2 toward the light detection unit 130. The laser beam is narrow in wavelength range and extremely high in monochromaticity, while light beams with various wavelengths exist in the outside light L2. Therefore, the wavelength range of light that can be transmitted through the dichroic mirror unit 131 may be reduced, and light with a wide wavelength range can be proceeded toward the light detection unit 130. The respective light beams with wavelengths near 450 nanometers, near 550 nanometers and 650 nanometers out of the outside light L2 proceeds toward the B-light source unit 121B, the G-light source unit 121G, and R-light source unit 121R in the same path as the laser beams from the respective color light source units in the reverse direction. Not only the case in which the single dichroic mirror unit 131 having a characteristic shown in FIG. 6 is provided, a combination of a plurality of dichroic mirror units having different properties can be employed.

Referring back to FIG. 5, by driving the scanning unit 200, the outside light 2 passed through the respective pixel areas on the screen 110 enters the light detection unit 130 in sequence. The light detection unit 130 detects outside light that passes through the screen 110. In association with scanning of the entire screen 110 with the laser beam L1, the light detection unit 130 can monitor the outside light L2 that passes through the screen 110 for the entire screen. An abnormality sensing unit 505 senses generation of abnormality on the screen 110 on the basis of the change of light intensity detected by the light detection unit 130.

A changeover switch unit 502 that switches between connection and disconnection of a channel for supplying electric power to the R-light source unit 121R is provided between the R-light source unit 121R and a power source 501. The switch unit 502 is a light beam emission stop unit for stopping emission of laser beam from the image display device 100 according to an output from the light detection unit 130.

Figure 7:
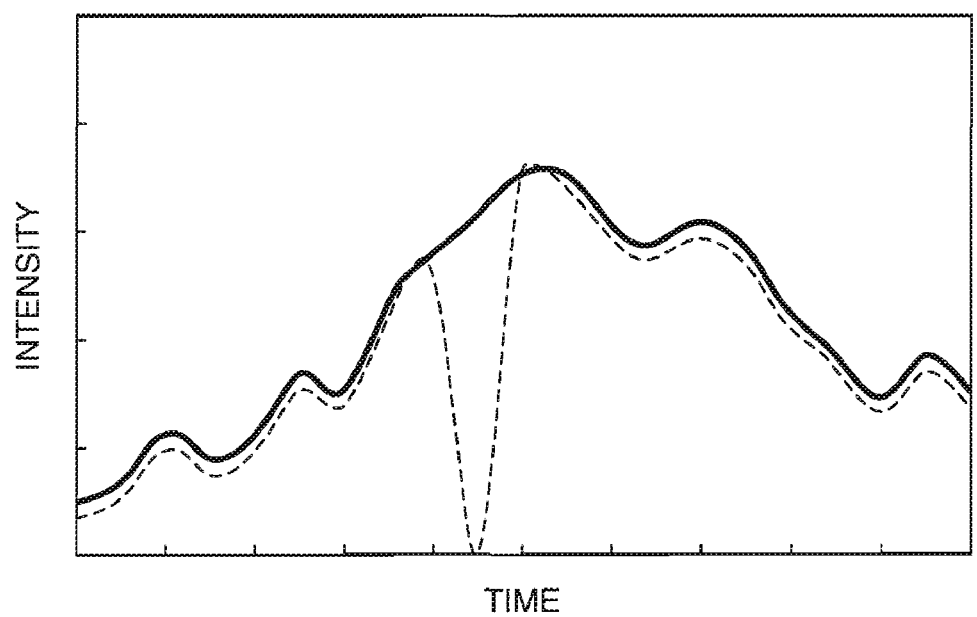
FIG. 7 shows an example of a relation between the light intensity detected by the light detection unit and time.

FIG. 7 shows an example of a relation between the light intensity detected by the light detection unit 130 and time. The vertical axis of a graph shown in FIG. 7 indicates the light intensity, and the lateral axis indicates the time (units are arbitrary). The abnormality sensing unit 505 compares the data of the amount of change in light intensity detected when the screen 110 is normal and data supplied from the light detection unit 130, so that whether or not the screen 110 is normal is determined. When there is no abnormality in the screen 110 and the light beam is diffused substantially uniformly on the screen 110, the light intensity detected by the light detection unit 130 constantly changes gently as shown by a solid line. When the change in light intensity detected by the light detection unit 130 is gentle, the abnormality sensing unit 505 determines that there is no abnormality occurred in the screen 110. As long as the abnormality sensing unit 505 determines that there is no abnormality occurred in the screen 110, the switch unit 502 continues connection between the R-light source unit 121R and the power source 501. The expression "the change in light intensity is gentle" can be described, for example, as a phenomenon such that the other side of a frosted glass that diffuses light beam can be seen in a blurred state.

On the other hand, when abnormalities such as damage or burning of the screen occurred in the screen 110, the diffusion characteristic of the outside light changes at the abnormal point. For example, when the intensity of a light beam incoming into the light detection unit 130 is abruptly reduced due to change in diffusion characteristics of the outside light, reduction or increase in light intensity is detected in a short time as shown by a broken line. When such an abrupt change is detected by the light detection unit 130, the abnormality sensing unit 505 determines that there is abnormality in the screen 110. When the abnormality sensing unit 505 determines that there is abnormality occurred in the screen 110, the switch unit 502 disconnects the channel between the R-light source unit 121R and the power source 501.

For example, when a hole is formed on the screen 110, the intensity of the outside light may abruptly increase at a location where the hole is made. In this case, the intensity of a light beam incoming into the light detection unit 130 is abruptly increases, and hence a sharp change is detected. In this case as well, the abnormality sensing unit 505 determines that there is abnormality in the screen 110. The expression "the change of the intensity of light is abrupt" can be described, for example, as a phenomenon such that crack on the frost glass can be visually recognized clearly or that the other side of the frost glass can be viewed clearly only through a hole formed thereon.

When the channel is disconnected by the switch unit 502, the power supplies to the G-light source unit 121G and the B-light source unit 121B are also disconnected as to the R-light source unit 121R. The switch unit 502 which is the light beam emission stop unit stops the supply of the laser beam from the respective color light source units, so that the emission of the laser beam from the image display device 100 is stopped. In this manner, when abnormality is occurred in the screen 110, the image display device 100 stops emission of the laser beam. By stopping emission of the laser beam from the image display device 100 in the case in which there is an abnormality occurred in the screen 110, the laser beam of high intensity is prevented from being emitted toward the outside of the enclosure 107.

The image display device 100 according to an aspect of the invention is configured to detect the outside light using displacement of the scanning unit 200, whereby the state of the entire screen 110 can be monitored with a single light detection unit 130. Since it is not necessary that the light detection unit 130 can recognize two-dimensional information such as pixels by itself, the light detection unit with high resolution is not necessary. The light detection unit 130 must simply be capable of at least detecting the light intensity, and hence may be of a simple arrangement. Since it is possible to provide the light detection unit 130 at a position other than positions that blocks the laser beam incoming into the screen 110, the state of the screen 110 can be sensed without lowering the efficiency of light utilization.

In addition, since the screen 110 can be monitored using the outside light that passes through the screen 110, an arrangement for supplying additional light for monitoring is not necessary. Therefore, a simple arrangement is achieved. Accordingly, abnormality of the screen 110 is sensed by a simple arrangement in which lowering of the efficiency of light utilization can be reduced, and hence the light beam of high intensity is advantageously prevented from being emitted toward the outside.

Figure 8:
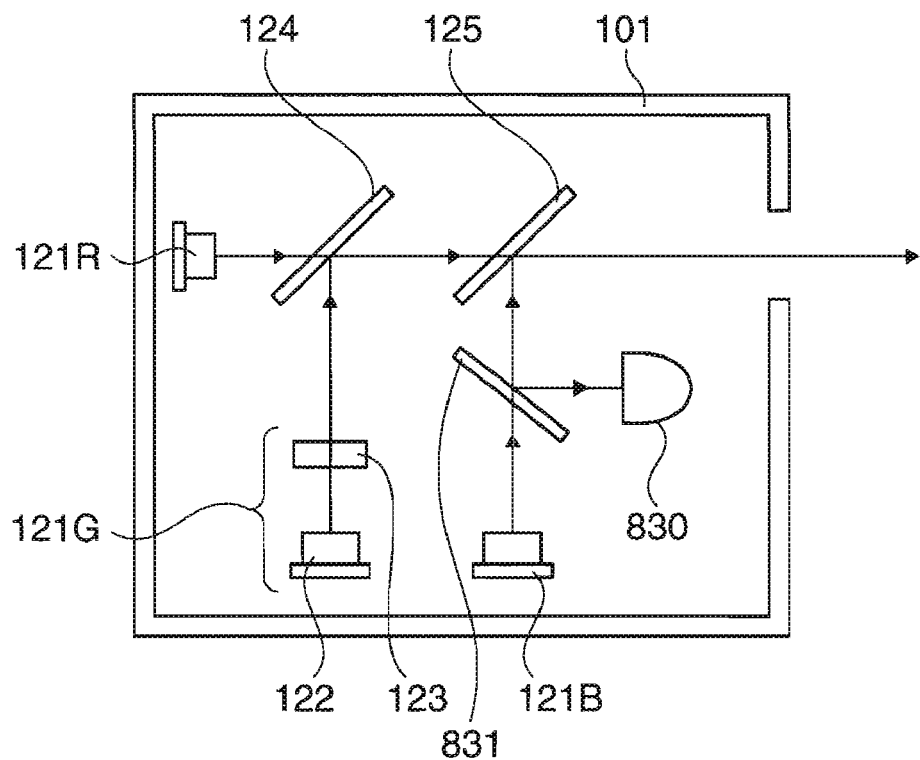
FIG. 8 is an explanatory drawing showing other positions where the light detection unit can be provided.

The light detection unit may be provided at a position different from that in FIG. 2. For example, as shown in FIG. 8, it may be provided at a position where light returning from the dichroic mirror unit 125 toward the B-light source unit 121B can be detected. A dichroic mirror unit 831 that reflects the light beam toward the light detection unit 830 is provided on the optical path between the dichroic mirror unit 125 and the B-light source unit 121B. The dichroic mirror unit 831 has a characteristic to transmit a light be with wavelengths near 550 nanometers, which corresponds to the peak of the B-light, and reflect light beams of other wavelengths. By transmitting the light beams with wavelengths near the 550 nanometers, the light beam from the B-light source unit 121B can be proceeded toward the scanning unit 200. The dichroic mirror unit 831 reflects light beams in the wavelength ranges narrower than the light beam reflected from the adjacent dichroic mirror unit 125.

The B-light or the light beam with the wavelength close to the B-light out of the outside light proceeded from the scanning unit 200 toward the laser device 101 is reflected from the dichroic mirror unit 125. The light beam other than the one with the wavelengths near 550 nanometers out of the light beam reflected from the dichroic mirror unit 125 reflect from the dichroic mirror unit 831 and enters the light detection unit 830. In this arrangement, the light detection unit 830 can detect the outside light that passes through the screen 110. The light detection unit may be provided between the R-light source unit 121R and the dichroic mirror unit 124 or between the G-light source unit 121G and the dichroic mirror unit 124.

Figure 9:
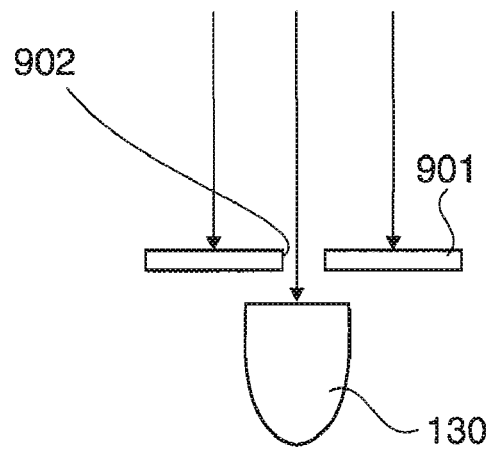
FIG. 9 is an explanatory drawing showing an arrangement in which an aperture unit is provided.

As shown in FIG. 9, an aperture unit 901 may be provided on the incoming side of the light detection unit 130. When the outside light passed through the screen 110 is proceeded toward the light detection unit 130, a light beam that has passed through a range larger than a laser beam spot in the screen 110 is proceeded toward the light detection unit 130 simultaneously. When the aperture unit 901 is provided, only part of the light beam passed through an opening 902 out of the light beam proceeded from the scanning unit 200 toward the light detection unit 130 enters the light detection unit 130. By providing the aperture unit 901 on the incoming side of the light detection unit 130, the light beam from the narrower range on the screen 110 can be detected, and hence the resolution can be increased. Accordingly, the abnormality of the screen 110 can be sensed accurately. However, the smaller the opening 902 becomes, the lesser the light beams that can enter the light detection unit 130. Therefore, it is preferable to use the light detection unit 130 with higher sensitivity in proportion with decrease in size of the opening 902.

Figure 10:
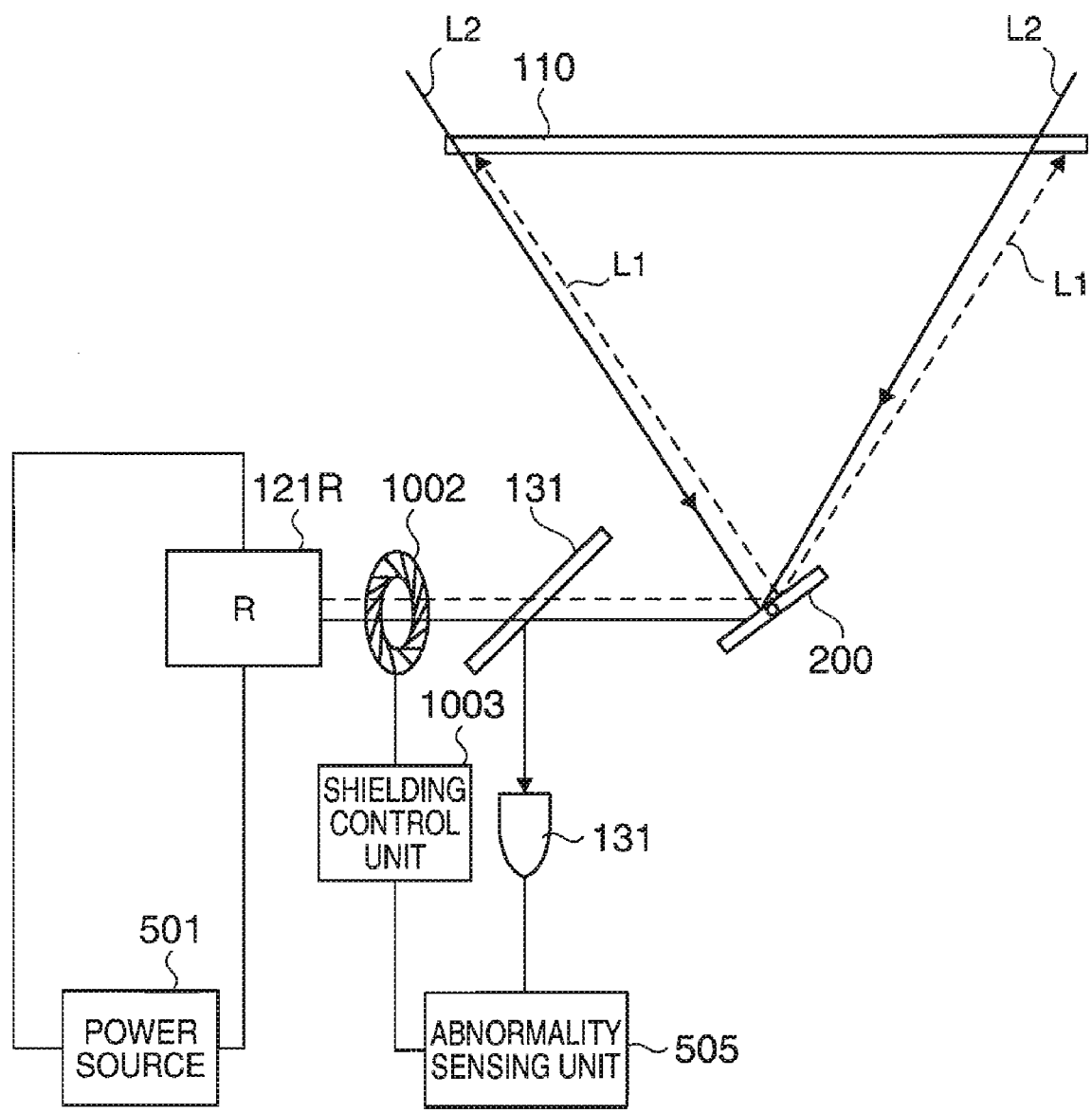
FIG. 10 is an explanatory drawing showing an arrangement of the image display device according to a modification of the first embodiment.

FIG. 10 is an explanatory drawing showing an arrangement of the image display device according to a modification of the first embodiment. The image display device in this modification is characterized in that a shielding unit 1002 is provided instead of the switch unit. The shielding unit 1002 is a light beam emission stop unit for stopping emission of the laser beam from the image display device by shielding laser beams supplied from the respective color light source unit. A shielding control unit 1003 keeps the shielding unit 1002 in an opened state so as to allow passage of the laser beam as long as the abnormality sensing unit 505 determines that abnormality is not occurred in the screen 110. When the abnormality sensing unit 505 determines that the abnormality is occurred in the screen 110, the shielding unit 1002 is closed by the shielding control unit 1003, and the laser beam is shielded.

Laser beams from the G-light source unit 121G and the B-light source unit 121B are also shielded in the same manner as the laser beam from the R-light source unit 121R. In this manner, when the abnormality is occurred in the screen 110, the image display device 100 stops emission of the laser beam. In this case as well, the light beam of high intensity is prevented from being emitted toward the outside of the enclosure. As the arrangement for preventing the light beam of high intensity from being emitted to the outside of the enclosure, for example, there are arrangements such that the optical path of the laser beam is changed to directions other than the direction toward the screen 110, or such that the gradation level of the laser beam is lowered in addition to those described in the first embodiment.

Second Embodiment

Figure 11:
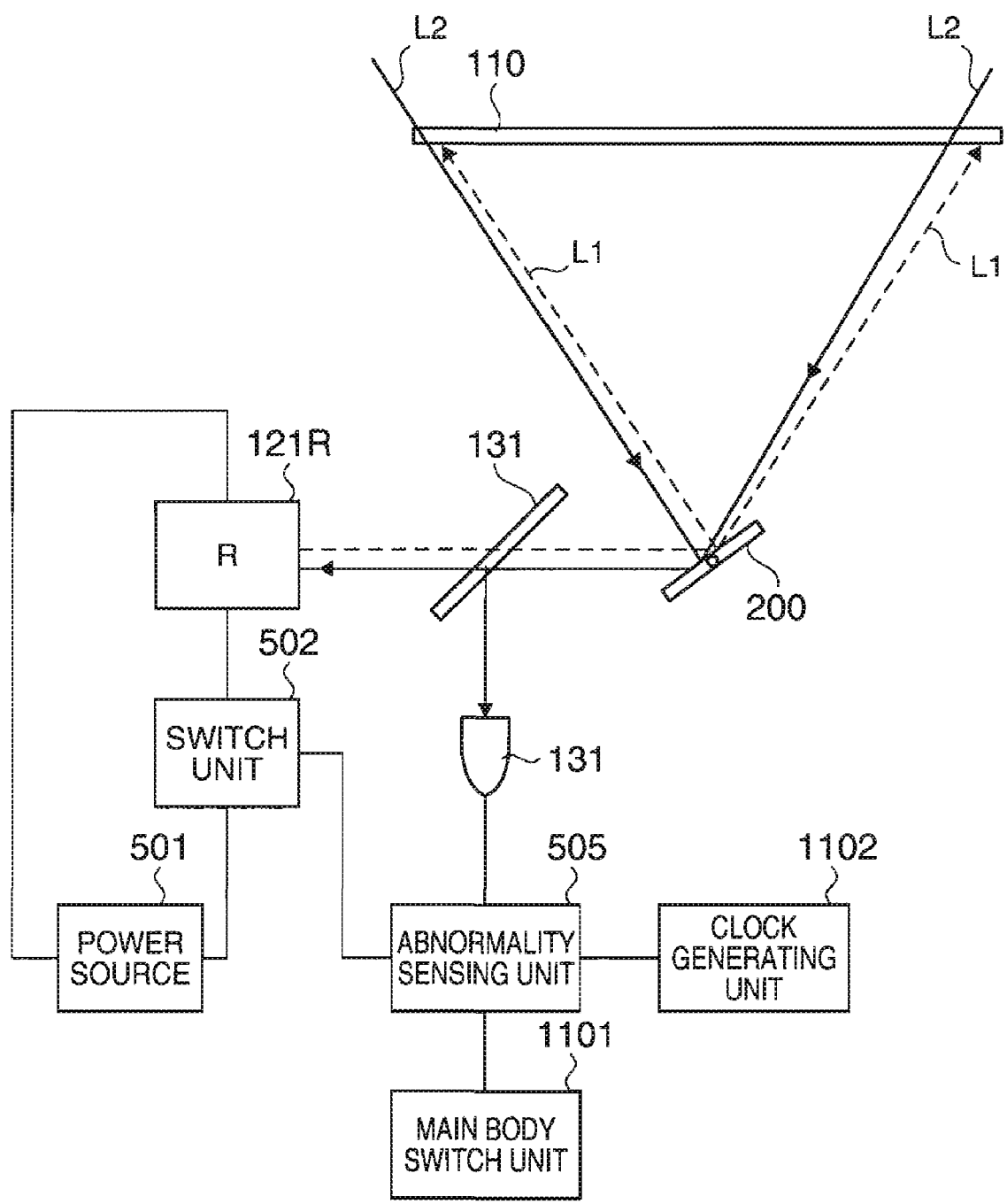
FIG. 11 is an explanatory drawing of an arrangement of an image display device according to a second embodiment of the invention.

FIG. 11 is an explanatory drawing of an arrangement of an image display device according to a second embodiment. The image display device according to the second embodiment is characterized by an arrangement in which an occurrence of abnormality in the screen 110 is sensed at the time of activation of the image display device. The same parts as the image display device 100 according to the first embodiment will be represented by the same reference numerals and overlapped description will be omitted. A main switch unit 1101 switches between activation and deactivation of the image display device. A clock generating unit 1102 generates clock signals.

Figure 12:
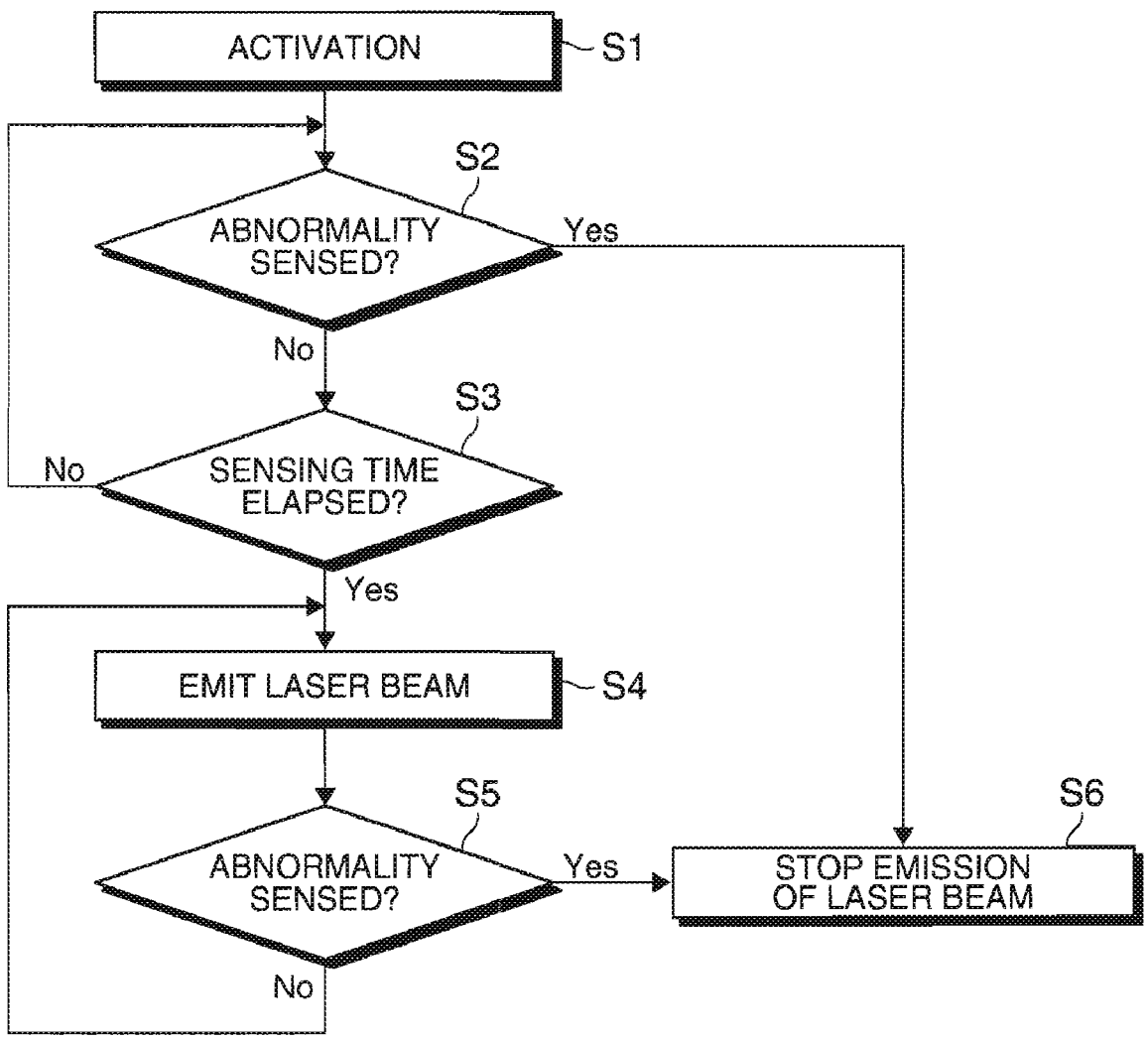
FIG. 12 is a flowchart for describing a method of controlling the image display device.

FIG. 12 is a flowchart for describing a method of controlling the image display device according to the second embodiment. In Step S1, the main switch unit 1101 is switched to activation. In Step S2, the abnormality sensing unit 505 senses presence or absence of an abnormality in the screen 110 according to the output from the light detection unit 130. During the time in which presence or absence of the abnormality of the screen 110 is sensed during activation of the image display device 100, supply of laser beams from the respective color light source unit is stopped. Stop of supply of the laser beams may be achieved by, for example, turning the switch unit 502 OFF. Step S2 is a step of sensing abnormality at the time of activation for sensing occurrence of abnormality in the screen 110 at the time of activation of the image display device 100 and before emitting the laser beam from the image display device 100. When the abnormality is sensed in Step S2, the state in which emission of the laser beam from the image display device 100 is stopped is maintained in Step S6.

The abnormality sensing unit 505 measures time from the moment when the main switch unit 1101 is turned into activation and compares the same with a predetermined sensing time for sensing the abnormality in the screen 110 at the time of activation of the image display device 100. Clock signals are used for measurement of the time from the clock generating unit 1102 by the abnormality sensing unit 505. When the abnormality in the screen 110 is not sensed during the predetermined sensing time in Step S3, emission of the laser beam from the image display device 100 is started in Step S4. During the period in which the image is displayed by emission of the laser beam, the presence or absence of an occurrence of the abnormality in the screen 110 is constantly monitored in Step S5. When the occurrence of the abnormality is sensed in Step S5, the emission of the laser beam from the image display device 100 is immediately stopped in Step S6.

Damages or the like of the screen 110 may occur before the activation of the image display device 100. In this embodiment, the fact that the abnormality is not occurred in the screen 110 is confirmed before emission of the laser beam by sensing the abnormality of the screen 110 at the time of activation of the image display device 100 and before emission of the laser beam. Accordingly, a condition such that a light beam of high intensity is emitted toward the outside from occurring at the time of the activation can be prevented.

Third Embodiment

Figure 13:
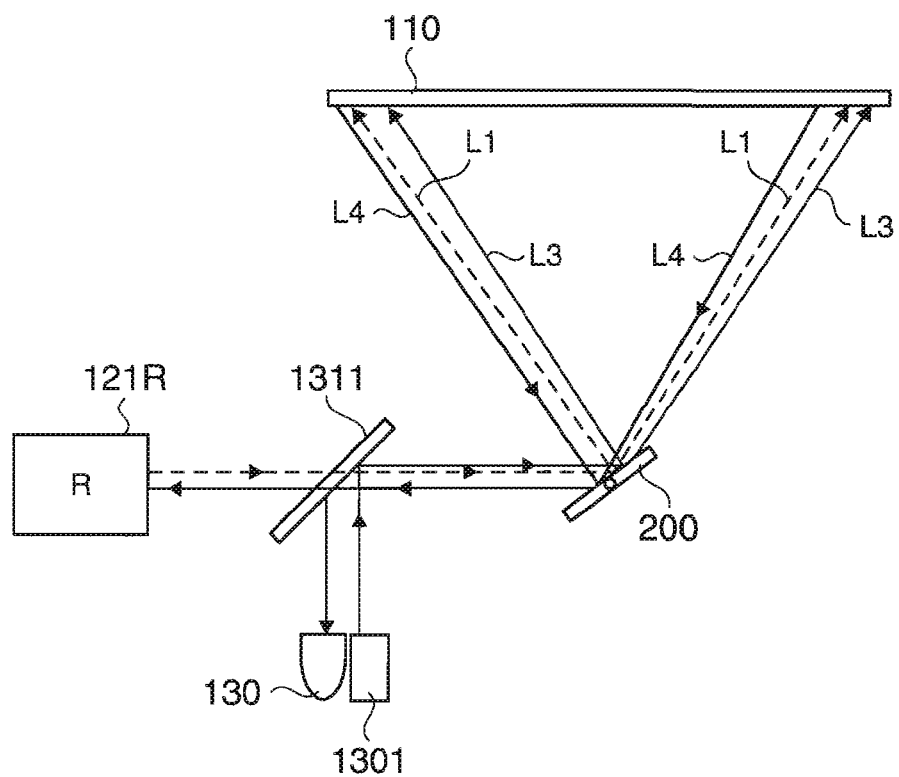
FIG. 13 is an explanatory drawing showing an arrangement of an image display device according to a third embodiment of the invention.

FIG. 13 is an explanatory drawing showing an arrangement of an image display device according to a third embodiment of the invention. The image display device in the third embodiment is characterized by a detection light source unit 1301 that supplies a detection light beam L3 to the screen 110. The same parts as the image display device 100 in the first embodiment are represented by the same reference numerals and overlapped description will be omitted. The light detection unit 130 detects the detection light beam L3 reflected from the screen 110. A detection light source unit 1301 is provided near the light detection unit 130 at a position adjacent to the light detection unit 130.

The detection light source unit 1301 supplies light beams having a wavelength range other than a viewable range, such as infrared light as detection light. A dichroic mirror unit 1311 provided on the optical path between the R-light source unit 121R and the scanning unit 200 transmits the R-light, the G-light, and the B-light and reflects the infrared light. The detection light L3 from the detection light source unit 1301 is reflected from the dichroic mirror unit 1311, passes through the scanning unit 200, and enters into the screen 110. A detection light L4 reflected from the screen 110 returns toward the detection light source unit 1301 along the substantially same optical path as the detection light L3 in the reverse direction. The light detection unit 130 detects the detection light L4 as the light incoming from the screen 110 via the scanning unit 200. The detection light source unit 1301 for supplying the infrared light may be those which are less expensive in comparison with the light source units that supply invisible light.

In the case of the third embodiment as well, the light intensity detected by the light detection unit 130 abruptly changes when the abnormality is occurred in the screen 110 as in the case of the first embodiment. Therefore, by monitoring the detection light L4 from the detection light source unit 1301, the fact that the abnormality is occurred in the screen 110 can be sensed. Accordingly, even under the condition in which the outside light is insufficient, the state of the screen 110 can be monitored. In addition, even when the detection light L3 is proceeded toward the viewer with the laser beam for displaying the image, influence to contrast of the image can be reduced by employing the invisible light having the wavelength range other than the viewable range as the detection light.

Accordingly, lowering of the image contrast can be reduced. It is also possible to coat a selectively transmissive reflection film that allows passage of the laser beam L1 and reflects the detection light on an incident surface of the screen 110. With the provision of the selectively transmissive reflection film, the detection light L4 can easily be detected by the light detection unit 130, and the abnormality of the screen 110 can be sensed accurately. In addition, it is also possible to employ an arrangement in which the detection light reflected from the screen 110 is positively diffused. The detection light is not limited to the infrared light as long as it is invisible light, and for example, an UV light may also be employed. When the lowering of the image contrast can be reduced, visible light may be employed as the detection light.

Figure 14:
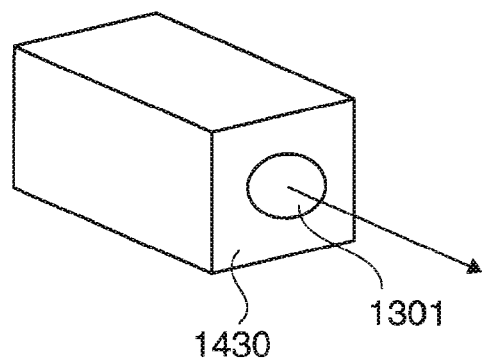
FIG. 14 is an explanatory drawing showing an example of another arrangement of the light detection unit.

The detection light L4 which is proceeded from the screen 110 toward the light detection unit 130 has a spread wider than the extent of spread thereof when it is emitted from the detection light source unit 1301 corresponding to the extent of being diffused in the screen 110. Therefore, by the provision of the light detection unit 130 in the vicinity of the detection light source unit 1301, entrance of the detection light L4 from the screen 110 into the light detection unit 130 is ensured. The light detection unit is not limited to an arrangement of being provided in adjacent to the detection light source unit 1301, and may be of an arrangement in which the detection light source unit 1301 is surrounded by a light detection unit 1430 as shown in FIG. 14.

The detection light from the detection light source unit 1301 must simply have an intensity that can sense the abnormality of the screen 110, and it is not necessary to secure the intensity as high as the laser beam for displaying the image. For example, even when the abnormality is occurred in the screen 110 when the image display device is activated, by reducing the intensity of the detection light by itself, the condition that the light with high intensity is emitted toward the outside of the image display device can be avoided.

Fourth Embodiment

Figure 15:
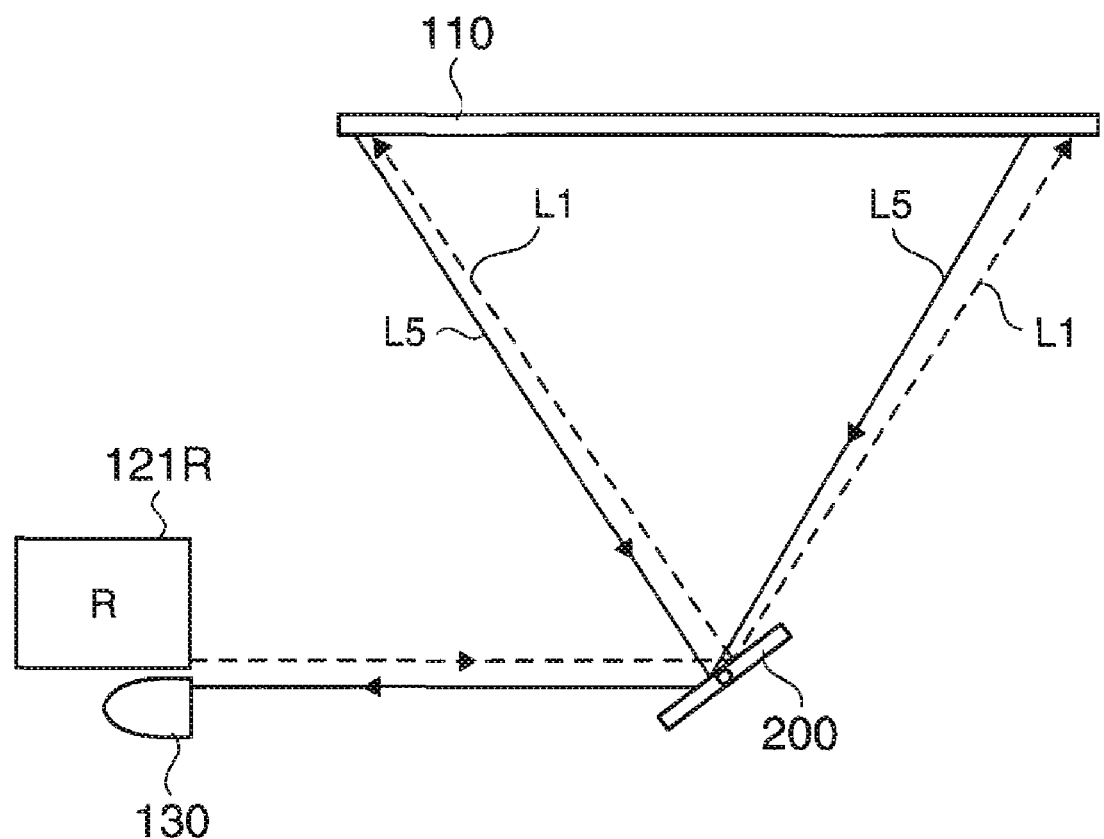
FIG. 15 is an explanatory drawing showing an arrangement of the image display device according to a fourth embodiment of the invention.

FIG. 15 is an explanatory drawing showing an arrangement of an image display device according to a fourth embodiment of the invention. The image display device in this embodiment is characterized in that the light detection unit 130 detects a laser beam L5 reflected from the screen 110. The same parts as the image display device 100 in the first embodiment are represented by the same reference numerals and the overlapped description will be omitted. The light detection unit 130 is provided in the vicinity of the R-light source unit 121R in adjacent to the R-light source unit 121R.

Part of the light L5 out of the laser beam L1 incoming from the respective color light source units into the screen 110 reflects from the screen 110, and then returns toward the respective color light source units along substantially the same path as the laser beam L1. The light detection unit 130 detects the light L5 incoming from the screen 110 via the scanning unit 200. The R-light passed through the dichroic mirror units 124, 125 (see FIG. 2) enters the light detection unit 130 provided in the vicinity of the R-light source unit 121R. In this embodiment as well, the intensity of the light detected by the light detection unit 130 abruptly changes when the abnormality is occurred in the screen 110 as in the case of the first embodiment.

Therefore, by monitoring the light L5 from the screen 110, the fact that the abnormality is occurred in the screen 110 can be sensed. Accordingly, even under the condition in which the outside light is insufficient, the state of the screen 110 can be monitored. The arrangement for supplying light for monitoring the state of the screen 110 or the dichroic mirror unit for branching the light to be entered to the light detection unit 130 from the optical path of the laser beam are not necessary, and hence a simple arrangement is achieved. When the light detection unit 130 is provided in the vicinity of the G-light source unit 121G and in the vicinity of the B-light source unit 121B, the G-light and the B-light are detected by the light detection unit 130. Monitoring of the state of the screen 110 is achieved if at least one light detection unit 130 is provided for one color light beam.

The light L5 proceeded from the screen 110 toward the light detection unit 130 has a wider spread in comparison with that when being emitted from the light source unit corresponding to the extent of being diffused in the screen 110. Therefore, by the provision of the light detection unit 130 in the vicinity of the light source unit, entrance of the light L5 from the screen 110 into the light detection unit 130 is ensured. In the fourth embodiment as well, the arrangement in which the detection light source unit is surrounded by the light detection unit (see FIG. 14) is also applicable. The arrangement in which the light detection unit 130 is arranged in the vicinity of the light source unit may be employed in the embodiment. For example, an arrangement in which the outside light is detected by the light detection unit 130 arranged in the vicinity of the light source unit may also be applicable. Alternatively, an arrangement in which the detection light source unit and the light detection unit 130 are arranged in the vicinity of the light source unit is also applicable.

In the case in which the method of controlling described in the second embodiment is employed, the laser beam L1 must simply have an intensity that can sense the abnormality of the screen 110 at the time of activation of the image display device, and it is not necessary to secure the intensity as high as the laser beam for displaying the image. It is also possible to adapt in such a manner that the intensities of the laser beams L1 from the respective color light source unit is cut down in the step of sensing abnormality at the time of activation, and after having confirmed that the abnormality is not occurred, the intensity of the laser beam L1 is increased. In this case, by reducing the intensity of the laser beam L1, even when the abnormality is occurred in the screen 110 at the time of activation of the image display device, the condition such that the light beam with high intensity is emitted toward the outside of the image display device can be avoided.

The image display device according to the respective embodiments described above is not limited to the arrangement in which the semiconductor lasers are used in the respective color light source units. The respective color light source units may be composed of other solid-state light sources, for example, a solid-state laser, a light-emitting diode element (LED), an EL element, as well as light sources other than the solid-state light sources, for example, a liquid laser or a gas laser.

As described thus far, the image display device according to the invention is useful when displaying images by scanning with the laser beam.

The entire disclosure of Japanese Patent Application No. 2005-198389, filed Jul. 7, 2005 is expressly incorporated by reference herein.

What is claimed is:

1. An image display device for displaying an image by a light beam modulated according to an image signal comprising:
   a light source unit that supplies the light beam;
   a scanning unit for performing scanning with the light beam from the light source unit;
   a screen that transmits the light beam from the scanning unit;
   a light detection unit that detects incoming light from the screen, the incoming light being transmitted from the screen to the scanning unit prior to hitting the light detection unit; and a light beam emission stop unit that stops emission of the light beam from the image display device according to an output from the light detection unit.

2. The image display device according to claim 1, wherein the light beam emission stop unit stops supply of the light beam from the light source unit to stop emission of the light beam from the image display device.

3. The image display device according to claim 1, wherein the light beam emission stop unit shields the light beam supplied from the light source unit to stop the emission of the light beam from the image display device.

4. The image display device according to claim 1, wherein the light detection unit detects the outside light that transmits through the screen.

5. The image display device according to claim 1 comprising: a detection light source unit for supplying detection light to the screen, wherein the light detection unit detects the detection light reflected from the screen.

6. The image display device according to claim 5, wherein the detection light source unit is provided in the vicinity of the light detection unit.

7. The image display device according to claim 5, wherein the detection light source unit supplies the detection light having a wavelength range other than a visible range.

8. The image display device according to claim 1 wherein the light detection unit detects the light beam reflected from the screen.

9. The image display device according to claim 1 comprising:
a dichroic mirror unit provided on the optical path of the light beam between the light source unit and the scanning unit, wherein the dichroic mirror unit transmits the light beam from the light source unit and reflects the light from the screen toward the light detection unit.

10. The image display device according to claim 1 wherein the light detection unit is provided in the vicinity of the light source unit.

11. The image display device according to claim 1 comprising:
an aperture unit provided on the incoming side of the light detection unit.

12. The image display device according to claim 1 comprising:
an abnormality sensing unit that senses occurrence of an abnormality in the screen on the basis of change in light intensity detected in the light detection unit.

13. A method of controlling an image display device comprising:
a light source unit that supplies the light beam modulated according to an image signal;
a scanning unit for performing scanning with the light beam from the light source unit;
a screen that transmits the light beam from the scanning unit;
a light detection unit that detects incoming light from the screen, the incoming light being transmitted from the screen to the scanning unit prior to hitting the light detection unit; and
a light beam emission stop unit that stops emission of the light beam from the image display device according to an output from the light detection unit,
comprising:
sensing occurrence of abnormality in the screen at the time of activation and before emitting the light beam from the image display device is provided.

* * * * *